Fig. 1

Oct. 3, 1961 S. BECKWITH 3,002,712
POLYCOPTER
Filed Feb. 1, 1957 11 Sheets-Sheet 2

Inventor
Sterling Beckwith by Parker & Carter
Attorneys

Oct. 3, 1961 S. BECKWITH 3,002,712
POLYCOPTER
Filed Feb. 1, 1957 11 Sheets-Sheet 3

Inventor
Sterling Beckwith by Parker & Carter
Attorneys

Oct. 3, 1961 S. BECKWITH 3,002,712
POLYCOPTER
Filed Feb. 1, 1957 11 Sheets-Sheet 6

Inventor
Sterling Beckwith
by Parker & Carter
Attorneys

Fig.14

Inventor
Sterling Beckwith
by Parker & Carter
Attorneys

Fig. 18

3,002,712
POLYCOPTER
Sterling Beckwith, 500 King Muir Road, Lake Forest, Ill.
Filed Feb. 1, 1957, Ser. No. 637,705
6 Claims. (Cl. 244—17.23)

This invention relates generally to the field of air transportation and has for one purpose a provision of an air transportation vehicle which shall be economical to manufacture and operate and which shall nonetheless provide the maximum in safety and reliability.

Another purpose is to provide an air transportation vehicle capable of vertical rise and descent, hovering, and motion through the air in any direction. I am aware that such vehicles, commonly known as "helicopters" are available and, while the vehicle of my invention is similarly maneuverable in the same medium, it is one purpose of my invention to provide a vehicle of this type which shall provide many advantages over the present, well known helicopter.

Another purpose is to provide maximum safety and reliability in such a vehicle while at the same time avoiding the requirement for one-hundred percent reliability of each of the parts such as is presently required in the case of helicopters. As is well known, in order to provide maximum safety, manufacturers and operators of helicopters spend great sums and effort to insure an absolute one-hundred percent reliability, insofar as is humanly possible, with respect to each of the many individual parts such as rotors, hubs, pitch control mechanism, free-wheeling clutches, etc. It is accordingly one purpose of my invention to provide the same or greater safety and at much less cost, while at the same time permitting manufacturers and operators of my vehicle to follow a more economical course, such as that found in automotive practice, for example, respecting reliability criteria on individual parts.

Another purpose is to eliminate the need for cyclic pitch and for the controls necessary to achieve cyclic pitch variations while at the same time retaining all of the advantages presently achieved in the field of helicopters by the use of cyclic pitch.

Another purpose is to eliminate the need for so called "tail-rotors" and similar anti-torque devices commonly employed in the field of helicopters.

Another purpose is to provide an air transportation vehicle of the type described which shall employ a number of thrust or lift developing units, such as the rotors shown in the enclosed drawing, sufficient to bring the structure and operation of such a vehicle across a certain "threshold" at and beyond which the maximum in safe operation with one rotor out of service may be achieved and short of which operation with one rotor out of service is unsafe.

Another purpose is to provide for the use, in a vehicle of the type described, of a lighter, smaller rotor for rotation at high speed.

Another purpose is to provide for balanced control of a vehicle of the type described and for self-centering of such control.

Another purpose is to provide, in a vehicle of the type described, a number of separate, isolated independent, lift-producing or motion-producing assemblies wherein each assembly is an independent self-contained unit including the main motion-producing elements and all of the accessories necessary thereto.

Another purpose is to provide a vehicle of the type described wherein the need for provision of landing or alighting gear of sufficient strength and resiliency to stand the shock of an auto-rotative landing is eliminated.

Another purpose is to provide for use, in a vehicle of the type described, of a number of motion-creating elements, such as rotors, each with its own individual power source.

Another purpose is to provide, in a vehicle of the type described, a rotor and power source movable together to provide a directional control of the vehicle.

Another purpose is to provide a simplified control system for vehicles of the type described.

Another purpose is to provide a control system for vehicles of the type described wherein individual lift-producing elements or groups thereof may be detached from a central manually operable control.

Another purpose is to provide a vehicle of the type described which shall be capable of employing power sources of maximum simplicity and of minimum weight and cost.

Another purpose is to provide a vehicle of the type described wherein integral structural elements perform the additional function of serving as separate accessory units for individual lift-producing elements.

Another purpose is to provide a vehicle of the type described wherein a number of individual interchangeable lift-producing units are employed.

Another purpose is to provide for use in a vehicle of the type described, a control mechanism wherein engine throttling and rotor pitch interconnect to provide control simplification and self-governing engine speed.

Another purpose is to provide a construction by means of which thrust or lift capacity can be created at any desired value by varying the number of thrust or lift-producing assemblies.

Another purpose is the provision of a control system effective to cause rotor lift to tend toward self-balancing on opposite sides of and at opposite ends of vehicle, regardless of the width or length of the vehicle.

Another purpose is to provide a control system wherein a separate throttle control is avoided and a simplified control system is achieved.

Another purpose is to provide a range of pitch control such that, in the event of loss of lift from one rotor, the opposite rotors can be reduced in lift enough to retain balance of the vehicle without shifting the center of gravity.

Another purpose is to provide a configuration and lifting characteristic permitting a wider range of center of gravity movement, both laterally and longitudinally, than that achieved on conventional vehicles of the class having one or two rotors.

Another purpose is to provide a rotor vehicle alignment such that all rotors can rotate in the same direction and yet not produce a rotational force on the vehicle, thus simplifying construction and interchangeability.

Another purpose is to provide a control system wherein a substantial portion of the lift is transmitted to the pitch control wire and is balanced with the lift of the opposite rotor through bell-cranks and connections of such proportions that control friction is reduced to a minimum to assist in achieving a largely self-balancing vehicle.

Another purpose is to provide a helicopter in which free-wheeling clutches are not required.

Another purpose is to provide sufficiently low stored energy in the rotor blades so that they can be initially rotated with the starting of the engine, the requirement for a clutch being thereby eliminated.

Another purpose is to provide rotor blades of such light construction relative to their lift-producing capability that they assume a relatively large coning angle causing a failed blade to fly upwardly and outwardly at an angle, thus insuring safe clearance of other rotor blades.

Another purpose is to provide an adequately flexible engine assembly mounting so that the normal pulsation of lift of a two blade rotor in forward flight will be absorbed by the engine inertia and relatively little pulsation will be transmitted to the ship or fuselage. This permits the use of the simplest type of rotor construction, which is a two blade rotor, and also will isolate not only the pulsation in lift but also other aerodynamic force pulsations or vibrations.

Another purpose is to provide a heavily tapered rotor blade, thus reducing torsional blade flexibility to the point at which mass balancing along the blade chord can be substantially reduced or avoided.

Another purpose is to provide a rotor blade twisted in a predetermined manner during fabrication so that the lift at all points along the blade corresponds as closely as possible with the centrifugal force acting on the tapered blade, thereby reducing blade bending moments to a minimum.

Other purposes will appear from time to time during the course of the specification and claims.

I illustrate my invention more or less diagrammatically in the following drawings, wherein—

Like parts are indicated by like numerals throughout the specification and drawings.

Multi-engine aircraft are the standard of safety and are almost exclusively used on commercial airlines. Multi-engine aircraft make possible the use of land based planes in long over-water flights. Use of the term "multi-engine" in this connection usually means enough engine assemblies including controls, propellers, pitch changing mechanisms, oiling systems, etc., so that loss of one assembly will leave adequate control and power for a safe landing.

Now if existing helicopters are examined from the same point of view, none meet the test of being "multi-engine" in the same sense, and furthermore, the term multi-engine does not convey the same meaning as it does with airplanes because a two rotor helicopter, even with two engines cannot land safely with one rotor out of service. I propose, therefore, a multi-rotor helicopter capable of safe operation with less than all rotors in service, having no less than five or six rotors. Such a vehicle could more correctly be called a "Polycopter," for example, to distinguish it from the multi-engine or multi-rotor ships such as those now in existence which will not operate with one rotor out of service.

While a four rotor configuration could develop about half normal lift with one rotor out of service and the opposite rotor reduced to zero lift to maintain equilibrium, such a ship would then have control in only one axis, would not meet the criteria thus established, and could not properly be called a "Polycopter." Use of cyclic pitch controls might permit some control of a four-rotor vehicle. When enough rotors are used to give "Polycopter" characteristics, however, collective pitch only will be required and the complications of cyclic pitch will be unnecessary as well as undesirable. Merely adding rotors will not of itself accomplish the desired result. It is necessary also to provide the proper configuration and to insure the safe operability of the remaining rotors upon the failure of one or more of those provided, while at the same time avoiding the extreme costs and complicated mechanisms presently deemed necessary.

Figure 1:
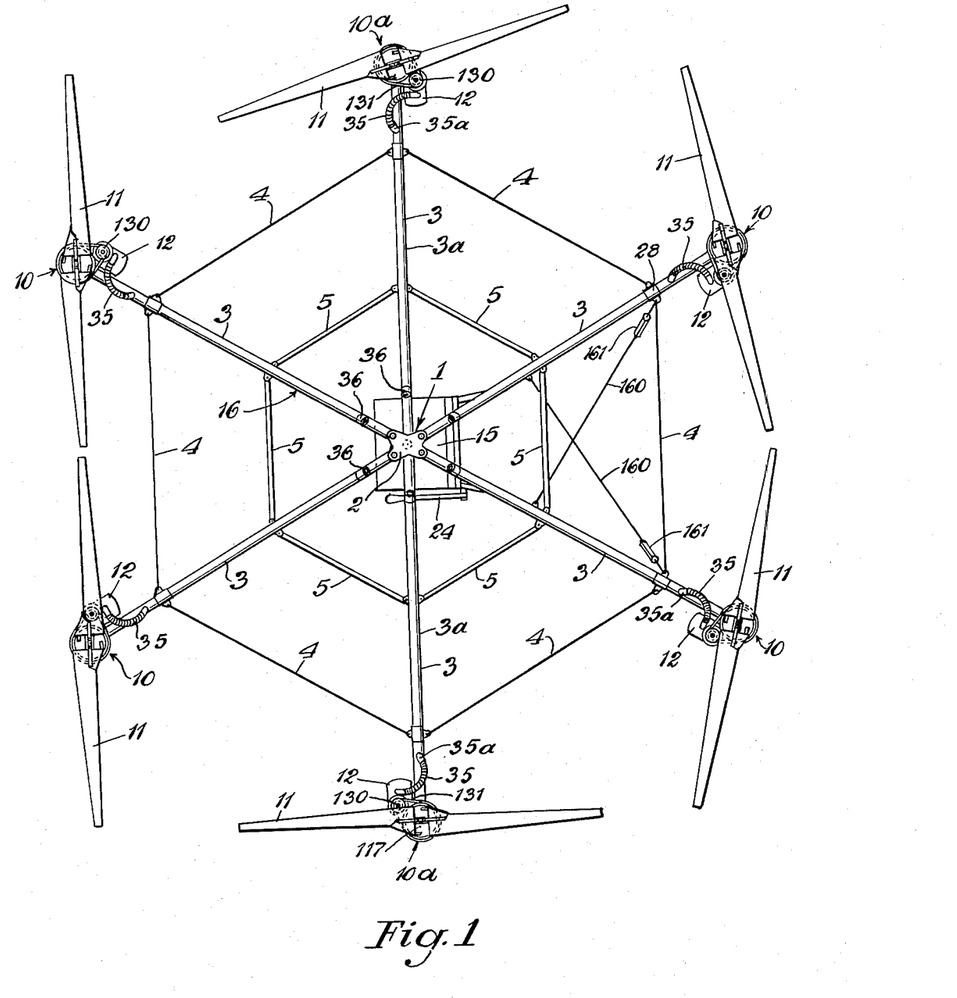
FIGURE 1 is a top plan view of the upper portion of the vehicle of my invention.

Referring now to the drawings and particularly to FIGURE 1, the numeral 1 generally indicates an air vehicle body. While the body 1 may be viewed as a frame or a support frame for the lift-producing or motion-creating elements, it will be understood that the numeral 1 designates generally the body or fuselage of my vehicle as well. Thus the body 1 may comprise a central mounting or base plate 2 from which radial, equally circumferentially spaced upper arm or struts members 3 extend. As will be further described, the members 3 are illustrated as six in number. Lying in a normally horizontally disposed plane of the arms 3 are a plurality of outer braces or tie-struts which may comprise for example the cable or wire members 4, similarly six in number. Inner or intermediate struts are provided and these may, for example, take the form of tubular braces or tie-struts 5, also six in number. It will be observed that each of the members 4, 5 are connected at their opposite ends to adjacent radially disposed arms 3. One set of oppositely directed arms 3 may, for convenience, be further designated by the numeral 3a, the purpose of which will appear hereinbelow. While the fuselage or hull 1 is illustrated as described, it will be understood that the member 1 could take a variety of forms, each effective to support a plurality of motion-creating assemblies substantially symmetrically about a central axis, in pairs of oppositely disposed assemblies, without departing from the nature and scope of my invention. An odd number of arms or assemblies can be embodied.

Supported adjacent the outer extremity of each of the arms 3, and therefore six in number, are the motion or lift-producing assemblies 10, each of which comprises a rotor assembly 11 and an individual power source 12.

FIGURE 1 illustrates an operator support or seat positioned beneath the central or axial plate 2 and, while the operator support, which may take the form of a chair member 15, will be further described hereinbelow, it is referred to at this point for the purpose of illustrating that the chair faces laterally of the arm or radial strut members 3a. Similarly, while the member 1 is employed to designate the overall vehicle body or fuselage of my invention, the numeral 16 may serve to designate together the arms 3 and plate 2 comprising the upper horizontally disposed frame element thereof.

Figures 2, 6, 7:
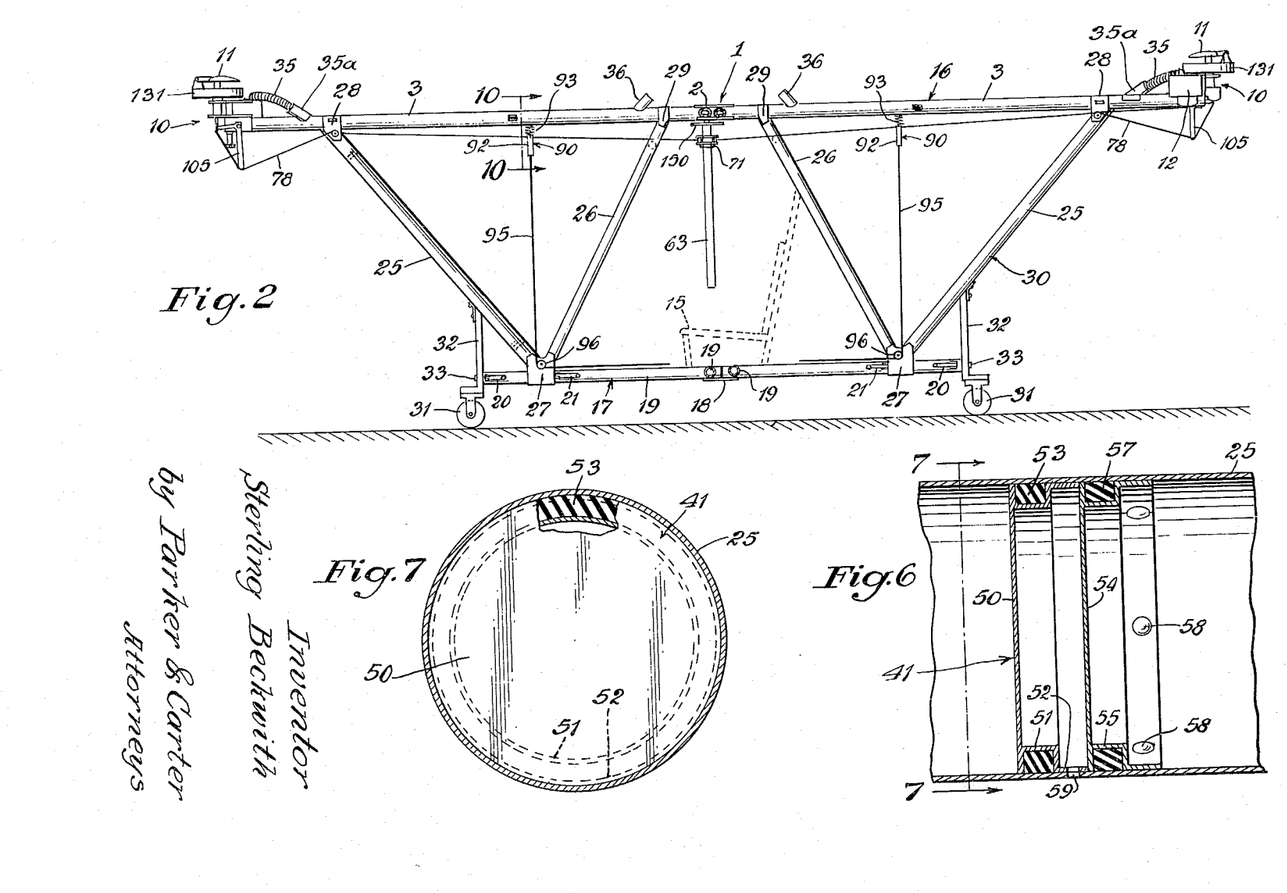
FIGURE 2 is a side elevation on a slightly enlarged scale.
FIGURE 6 is a detail view in partial cross-section of a seal arrangement employed in the structure of my invention.
FIGURE 7 is a view taken on the line 7—7 of FIGURE 6.
Figure 3:
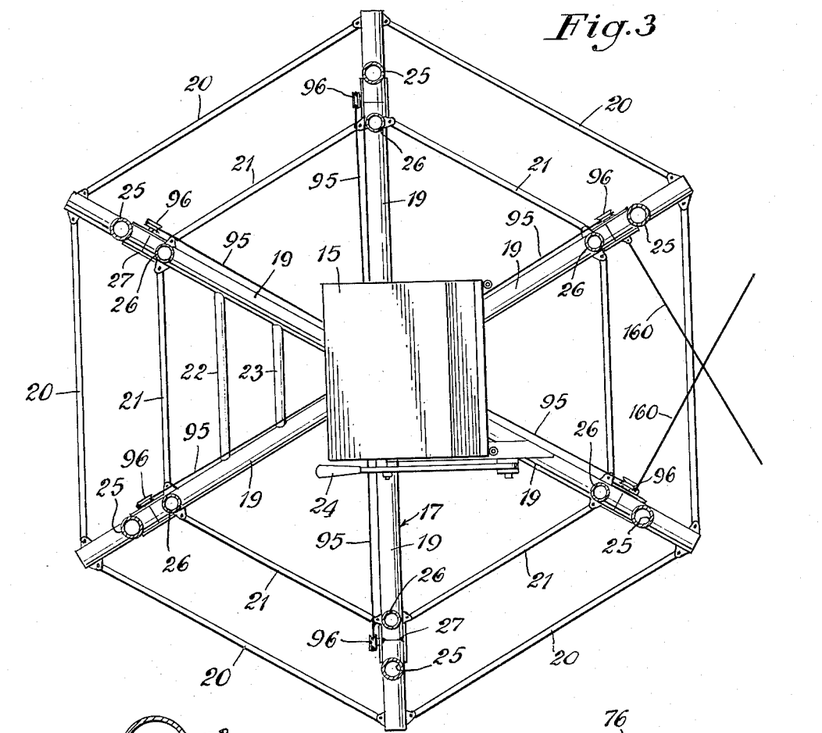
FIGURE 3 is a top plan view, on a still further enlarged scale of the lower portion of the structure illustrated in FIGURES 1 and 2.

Referring now to FIGURES 2 and 3, a lower horizontally disposed frame element generally indicated by the numeral 17, may comprise a central or base plate 18 vertically aligned with the plate 2 described above. Extending radially from the plate 18 are lower arm or strut elements 19. It will be observed that the elements 19 are six in number and are vertically aligned with the upper radially disposed arms 3. Outer tubular brace elements 20, six in number, and inner tubular brace elements 21, also six in number, extend between and have their opposite ends connected to each set of adjacent arms 19. For convenience, I may provide cross-arms 22, 23 between the forwardly disposed radial arms 19 in front of the seat 15 and these may serve as ingress and degress supports for the operator as well as foot rests during operation. A control rod 24 is illustrated in FIGURE 3, the purpose and function of which will appear hereinbelow.

As best seen in FIGURE 2, angularly disposed outer support struts or arms 25 are provided. These are six in number and extend each between a lower radially disposed arm 19 and a vertically aligned upper radially disposed arm 3, the arms 25 lying in a plane upwardly outwardly inclined from the base or lower frame 17 to the upper frame 16. Inner angularly disposed structs or arms 26, also six in number, lie in an upper inwardly disposed plane and each extends between and is connected at its opposite ends to the lower frame 17 and upper frame 16. Each set of support frame members 25, 26 may be secured to one of the lower radial arms 19 at a single point such as that illustrated at 27, the outer upwardly inclined arms 25 being secured to the vertically aligned radial arm 3 of the upper frame 16 as at 28. The inwardly, upwardly disposed support arms 26 are secured to the same vertically aligned radially disposed upper arm 3 of the upper frame 16 as at 29. The intermediate frame structure comprising the six arms or struts 25 and the six arms or struts 26 may, for convenience, be designated generally as the supporting or connecting frame 30.

While the members 3, 19, 25 and 26 may be formed of a variety of materials, I find hollow aluminum tubing to be preferable.

Any suitable alighting or ground-movement supporting elements may be provided. I may, for example, supply a suitable number of wheel or caster members 31 suspended from an appropriate number of outer arms 25 as by a member 32 which may in turn be secured to the outer extremity of an aligned lower radial arm 19 as at 33.

FIGURE 2 illustrates an exhaust conduit 35 extending from the power plant or power source 12 to an outer portion of a radial arm 3. Illustrated at 36 in FIGURE 2 is an outlet for the exhaust gas entering the hollow tubular arm 3 from the conduit 35, the arm 3 thus serving additionally as an exhaust gas conduit. It will be realized that each of the power plants 12 is provided with an exhaust conduit 35 entering its supporting arm 3 and that each of the arms 3 is provided with an exhaust outlet 36 upwardly, inwardly inclined and circumferentially spaced about and adjacent the central, vertical axis of the body 1 and plate 2.

Figures 4, 5:
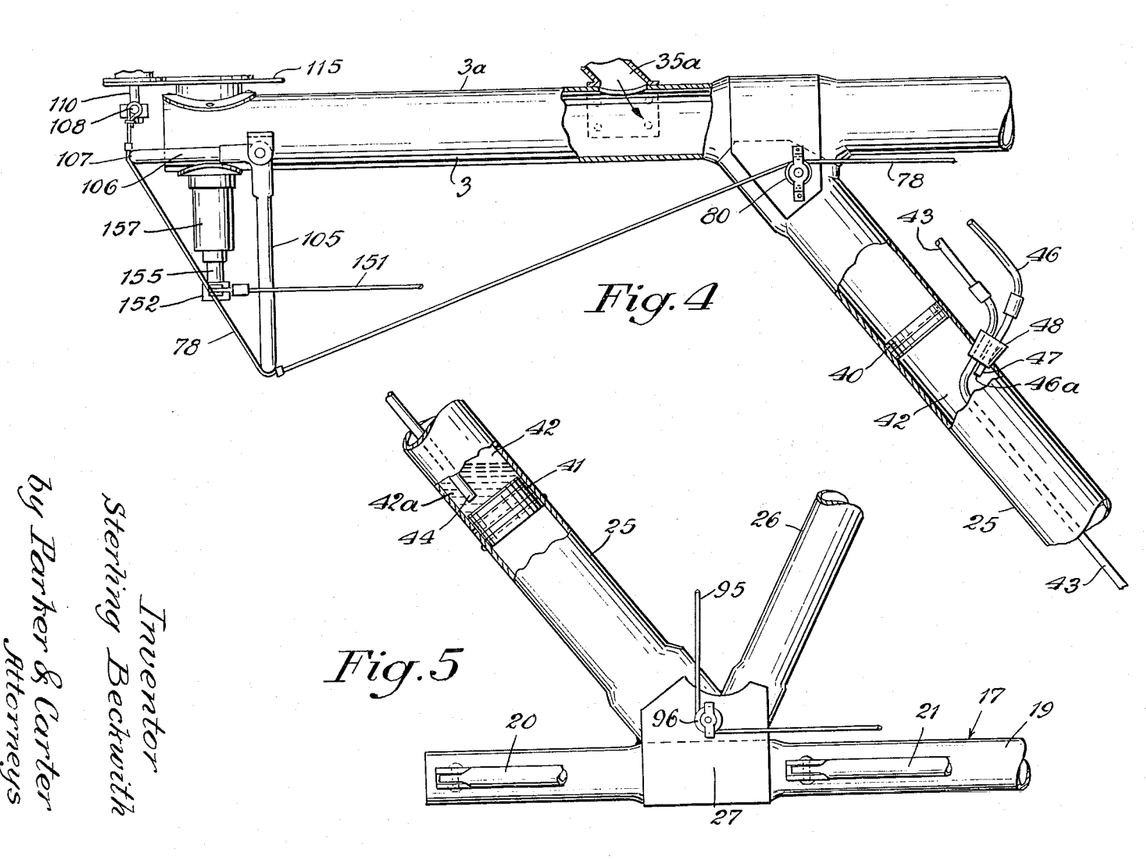
FIGURE 4 is a detail view on a still further enlarged scale partially illustrating the structure, control, supports, and power plant accessories of my invention.
FIGURE 5 is a detail view similar to that of FIGURE 4 and illustrating other portions of similar elements.

Referring now to FIGURES 4 and 5, and as above described, the members 25 may comprise hollow tubular members. As will be observed best in the lower right hand portion of FIGURE 4, I employ the members 25 additionally as individual fuel containers or fuel tanks. Adjacent the upper end of each of the members 25, I provide a seal member 40. As best seen in FIGURE 5, I provide a second seal member 41 adjacent the lower end of each of the members 25. The portion of the members 25 between the seals 40, 41 thus forms a fuel cell or fuel tank and for convenience this may be designated by the numeral 42. A fuel supply conduit or fuel line 43 may enter an upper portion of the tank 42 and extend longitudinally through the tank 42 to a point adjacent but spaced inwardly from the lower end of the tank formed by the seal element 41, as best seen at 44 in FIGURE 5. An air pressure conduit 46 may similarly enter the fuel tank 42 adjacent its upper portion as at 47 and may terminate at a point adjacent the upper end of the tank 42. While for convenience I illustrate the fuel and air pressure lines as entering the fuel cell 42 through a common compressible plug member 48, adjacent the upper portion of the tank 42, it will be realized that means for withdrawing the fuel from the tank 42 may be varied without departing from the nature and scope of my invention. As shown schematically in FIGURE 14, the fuel line 43 extends from the cell 42 to the carburetor or other fuel supply device associated with the power plant 12 and the air pressure line extends between the fuel tank 42 and an air pressure supply means associated with the power plant 12. The air pressure line 46 may, for example, be in communication with the crank case of an internal combustion engine when such constitutes the power source 12. It will be understood that air pressure entering the tank 42 through the air pressure inlet 46a of the conduit 46 forces the fuel 42a downwardly into the tank 42 and thereby into the inlet 44 of the fuel supply line 43 and upwardly therethrough to the power unit 12. It will be realized, therefore, that a separate, independent fuel tank, fuel supply line and fuel directing means is provided for each of the motion-creating elements 10.

The upper portion of FIGURE 4 illustrates in partial cross-section and with parts broken away, the exhaust inlet 35a into an arm 3, it being understood that the inlet 35a is secured to the exhaust pipe 35 of the power plant 12. Thus it will be seen that the members 3 serve as the integral portion of the vehicle body, a support means for the lift-producing assembly, and as an exhaust conduit for each of the power plant units within each lift-producing assembly.

FIGURES 6 and 7 illustrate the lower seal element 41 which may include a first circular plate 50 having an annular channel 51 secured to one face thereof. The channel 51 is outwardly open and borders the perimeter of the plate 50. An integral annular wall 52 extends from the channel 51 and has the same outside diameter as the plate 50. A flexible seal 53 is contained within the channel 51. It will be observed that the diameter of the plate 50 and wall 52 is substantially equal to the inner diameter of the tubular member 25 and that the seal 53 is therefore compressed against the inner wall of the member 25. The seal 41 may include a second plate 54 formed substantially identically with the plate 50 and having a similar channel 55, wall 56 and seal 57. The seal elements comprising the seal 41 may be secured to the member 25 in any suitable manner such, for example, as by the rivets 58. A drain opening 59 may be formed in the wall of the member 25 and may extend through the wall 52 of the upper seal element as illustrated.

Figures 8, 9:
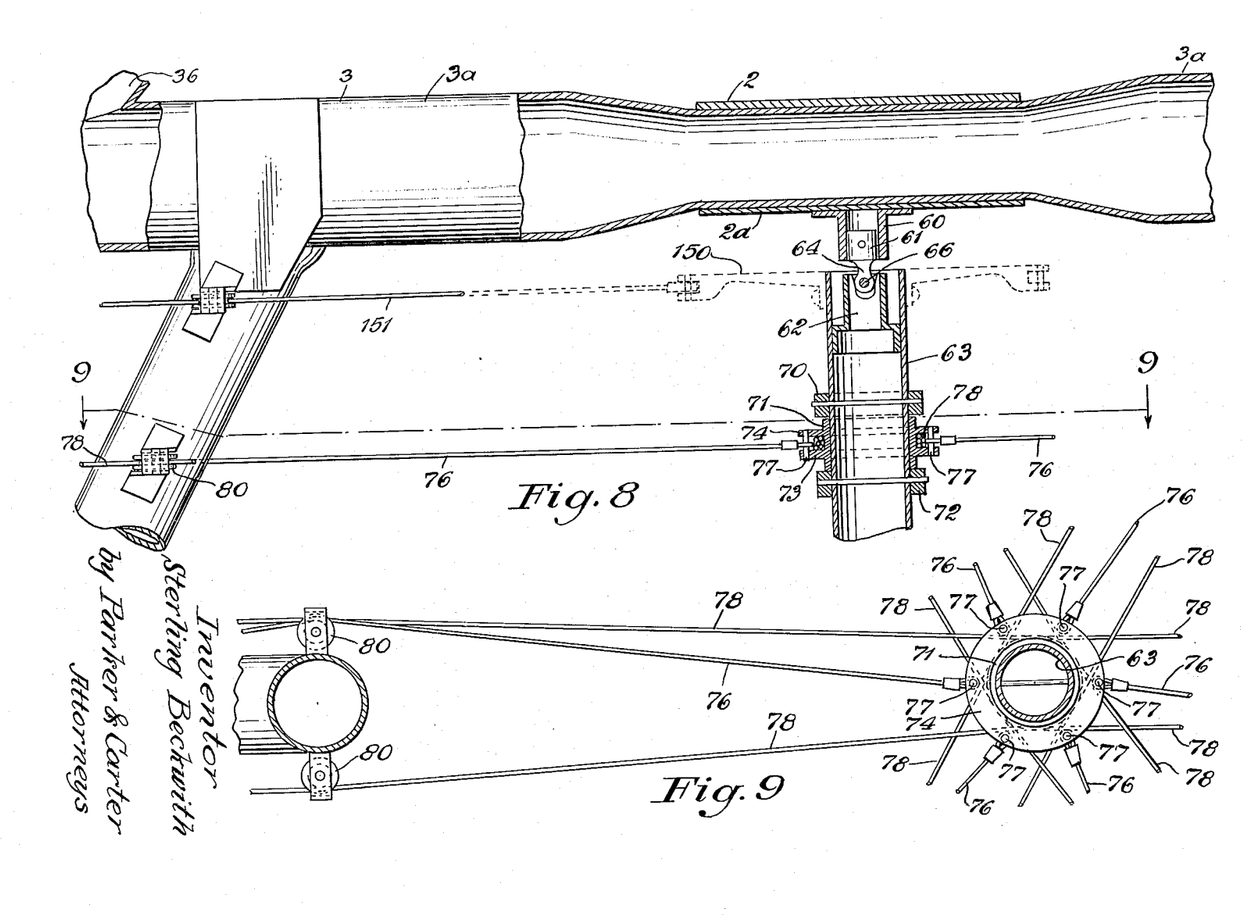
FIGURE 8 is a detail view in partial cross-section illustrating an element in the control system of my invention.
FIGURE 9 is a view taken on the line 9—9 of FIGURE 8.
Figure 10:
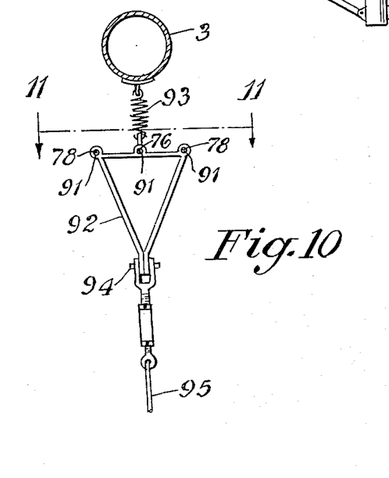
FIGURE 10 is a view taken on the line 10—10 of FIGURE 2.
Figure 11:
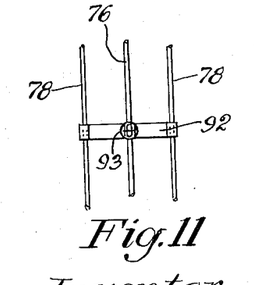
FIGURE 11 is a view taken on the line 11—11 of FIGURE 10.

Referring now to FIGURES 8 and 9, I illustrate a portion of the control system of my invention. Secured to the inner ends of the arms 3 in spaced axial alignment with the top plate 2, is an under plate 2a. A bracket member 60 is attached to the plate 2a and depends downwardly from the central point thereof. A male universal element 61 fits within the bracket 60 and carries a downwardly depending portion 64. The portion 64 is universally connected, as at 66, to a second bracket member 62 carried in the upper open end of the control stick member 63.

A pair of spaced collar members 70, 72 surround the control member 63 adjacent its upper end and serve to position between them a collar 71 surrounding the stick 63. The collar 71 carries a pair of spaced outwardly extending annular flanges 73, 74. A set of six power or throttle-control cables 76 is provided. Each cable 76 is secured to a vertical pin 77 which is in turn secured to the flanges 73, 74, the six pins 77 being circumferentially spaced thereon and bridging the flanges 73, 74 adjacent their periphery. Similarly, a set of six pitch-control cables 78 is provided. Each of the cables 78 has an inner portion turned about collar 71 and positioned between the flanges 73, 74. As best seen in FIGURE 9, each of the cables 78 therefore has a pair of substantially parallel major portions which parallel the adjacent arm 3 on their way to the lift or motion-producing assembly 10 carried thereby. Similarly, each of the throttle-control cables 76 substantially parallels its associated arm 3 on its way to a connection, for example, to the carburetor of a power plant unit 12. An appropriate number of suitable pulley members such as those indicated at 80 for example, are provided at required points on the vehicle body 1 and the cables 76, 78 are passed over and about said pulleys as required.

Figures 12, 13:
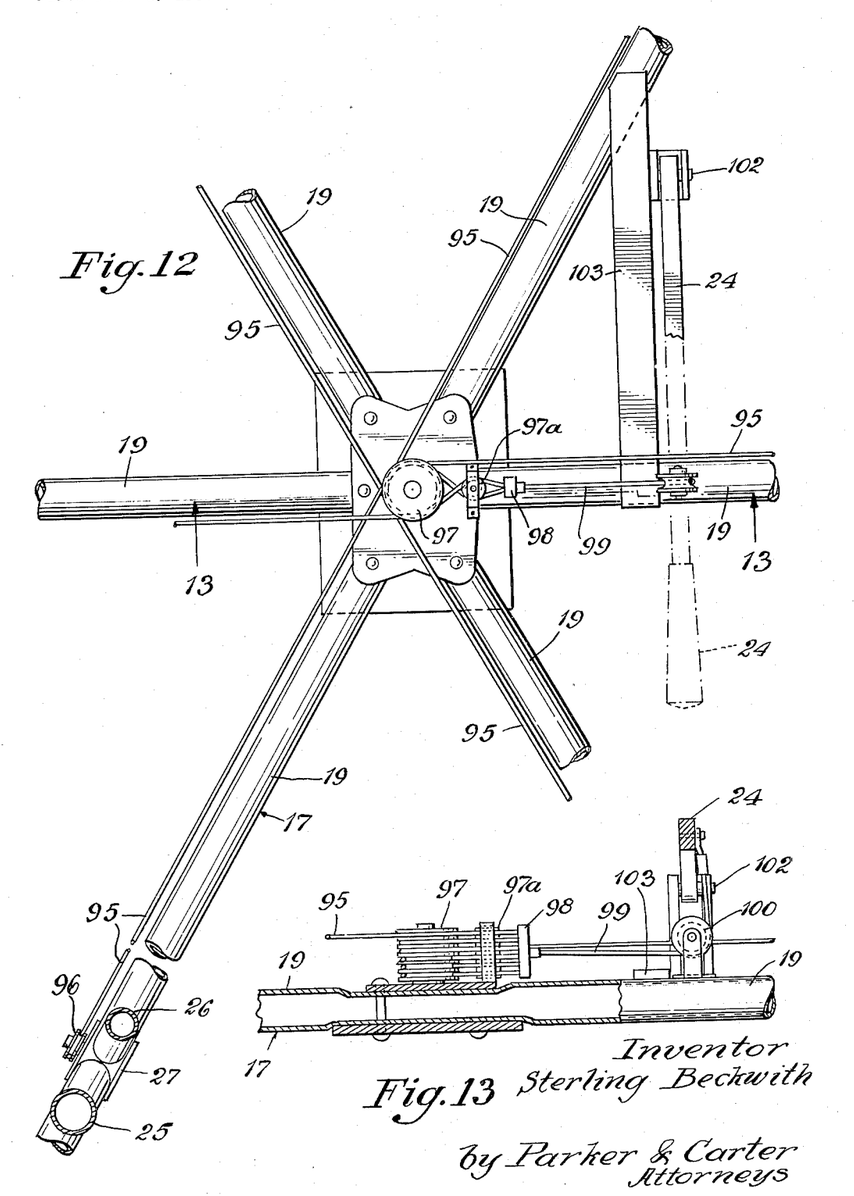
FIGURE 12 is a detail view illustrating another portion of the structure and control elements of my invention.
FIGURE 13 is a detail view in partial cross-section taken on the line 13—13 of FIGURE 12.

Referring now to FIGURES 2 and 10–13, it will be observed that the power or throttle-control cables 76 and pitch-control cables 78 each extend to one of the motion or lift-producing assemblies, the cables substantially paralleling the appropriate arm 3. At a suitable point intermediate each of the arms 3, for example as indicated at 90 in FIGURE 2, the cables 76, 78 pass through islets or openings 91 in a cable control bracket 92. The bracket 92 is suspended from its adjacent arm 3 by a yielding means such as the spring 93. Suitably connected, as at 94, to each of the brackets 92 is a combined throttle-and-pitch control cable or member 95. Each of the cables 95 extends downwardly and is turned about an appropriate pulley member 96 on the underlying radial arm 19. From thence each cable 95 parallels its adjacent arm 19 inwardly toward the central axis of the fuselage 1. At this point the cables 95 are wound about a pair of gang pulleys 97, 97a from whence they are connected to a bar member 98. The bar 98 is in turn secured to a control cable 99 which, after passing about the pulley 100, is directed upwardly, as best shown in FIGURES 12 and 13. The cable 99 is connected to the combined collective pitch-and-throttle control rod or member 24 pivotally mounted as at 102 on a brace member 103 secured to one of the arms 19 adjacent the pilot seat 15. The control stick 24 is shown in FIGURE 3 as being positioned to the left of the pilot seat 15.

Figure 14:
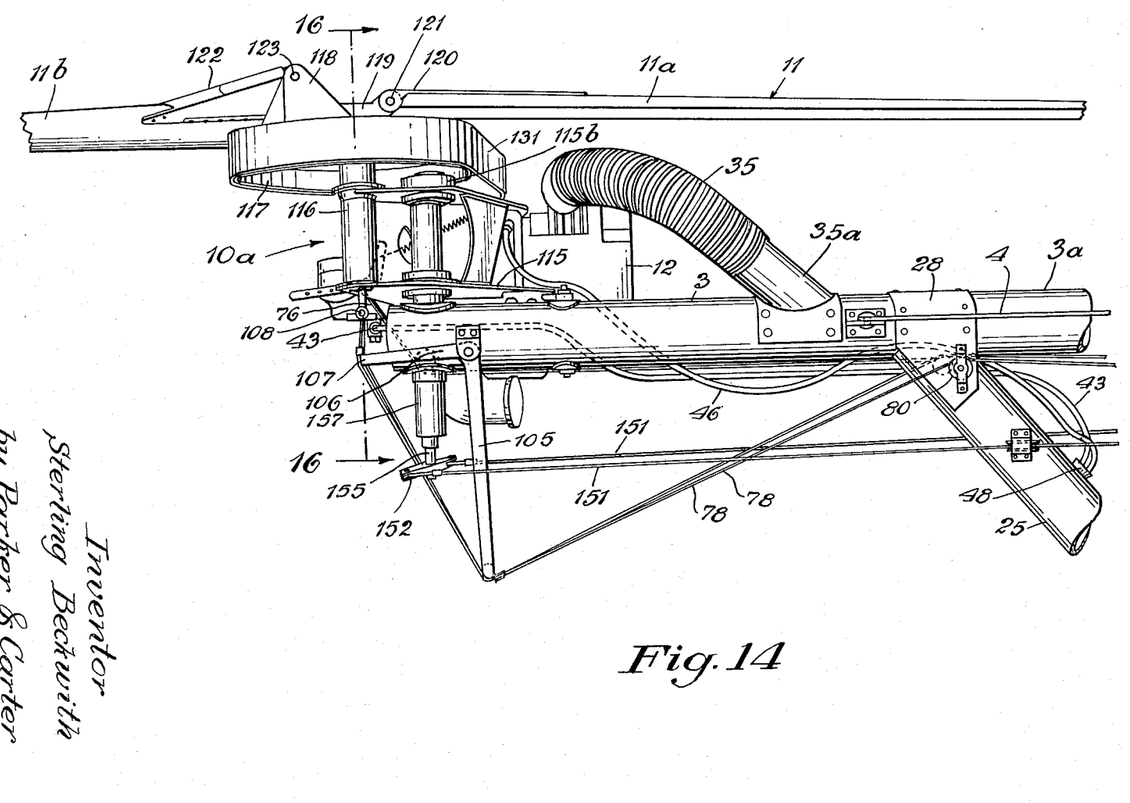
FIGURE 14 is a perspective view of a motion-producing assembly portion of my invention.
Figure 15:
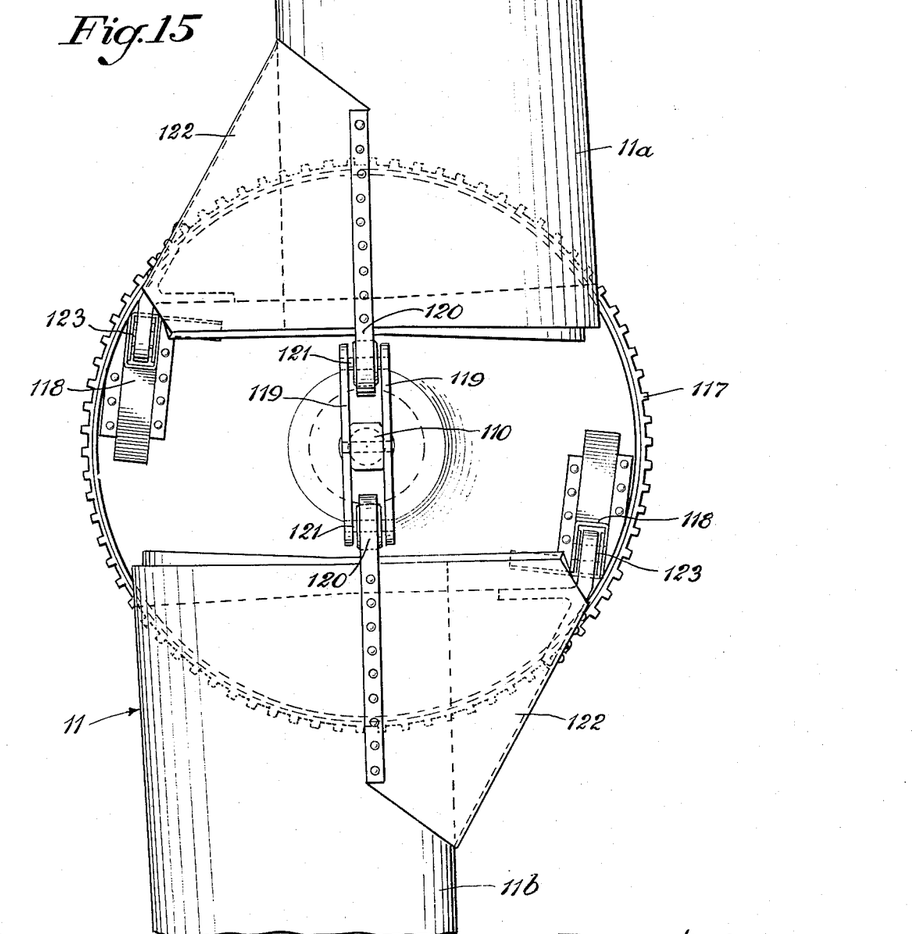
FIGURE 15 is a detail view, on an enlarged scale, illustrating a portion of the assembly shown in FIGURE 14.
Figure 16:
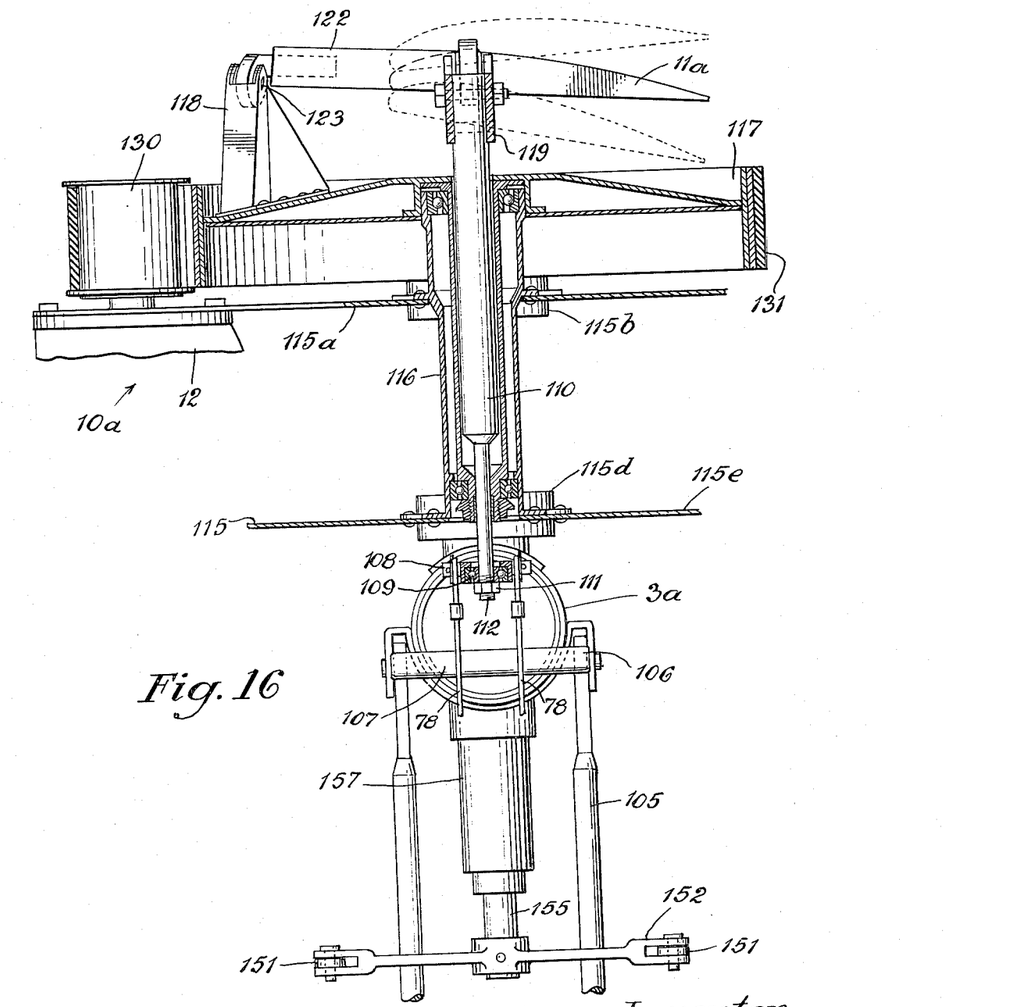
FIGURE 16 is an end view in partial cross-section taken on the line 16—16 of FIGURE 14.

Referring now to FIGURES 14–16, it will be observed that the pitch control cables 78 extend outwardly to a point adjacent the outer end of each of the arms 3. At these points the control cables 78 are directed about the lower end of an elongated arm 105 of a yoke member 106 from whence they are directed upwardly in an outwardly inclined plane and about the outer extending end of the arm 107 of the yoke 106. The cables 78 are connected above the arm 107 at their ends, to a crossbar member 108. The member 108 carries a bearing element 109 in which is rotatably mounted a pitch control shaft 110. A securing element 111 is secured to the outer downwardly extending threaded end 112 of the shaft or rod 110.

A mounting plate member or bracket 115 may be supported on the outer end of each of the arms 3. A vertical tubular housing portion 116 secured to the member 115 surrounds the shaft 110 and rotatably supports a rotary drum member 117 above the support element 115. Upstanding brackets 118 are secured to and diametrically spaced on the upper surface of the drum 117.

Figure 17:
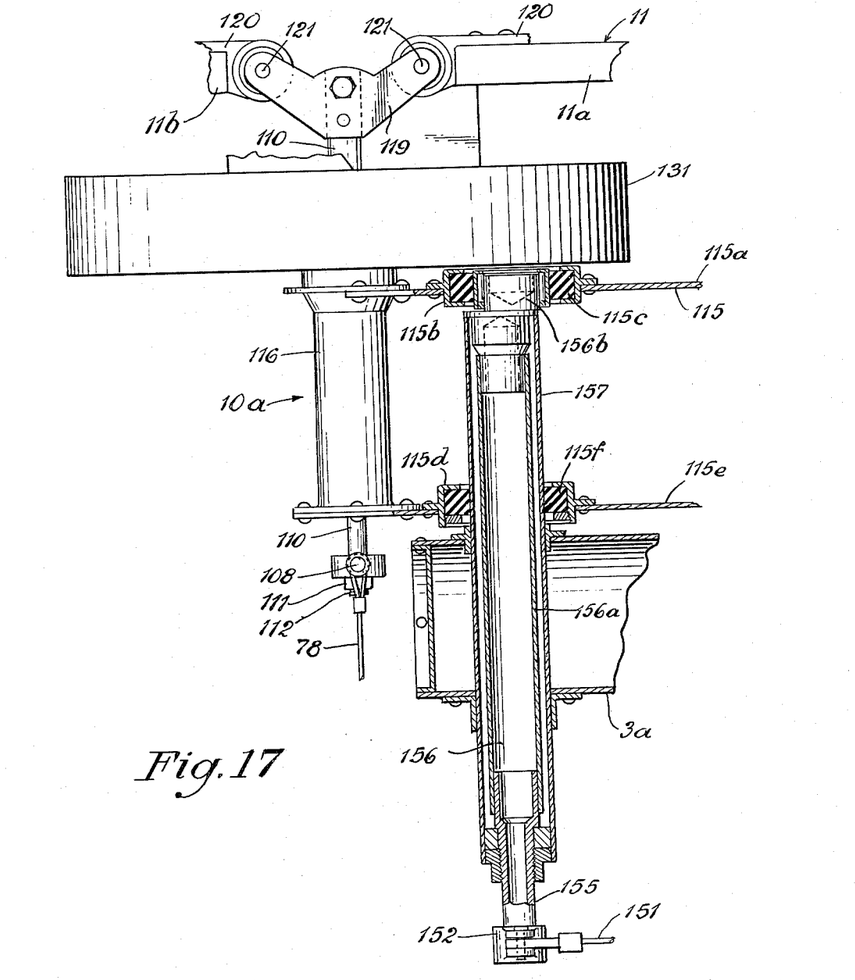
FIGURE 17 is a side view, in partial cross-section, of the structure illustrated in FIGURE 16.

As best seen in FIGURES 16 and 17, the shaft 110 extends upwardly above the drum 117 and carries at its upper end a substantially V-shaped yoke 119. Each of the blades of one of my rotor assemblies 11 carries a longitudinally inwardly extending arm 120, the inner end of which is both rotatably and tiltably connected to one of the oppositely disposed arms of the member 119, for example by a conventional ball joint or the like, as indicated generally at 121. Similarly, each of the blades 11a, 11b of the blade or rotor assembly 11 has a fillet portion 122 fixedly secured thereto at its inner end. Each of the fillet portions 122 is tiltably and rotatably connected to one of the brackets 118, as by a conventional ball joint or the like at 123. As best seen in FIGURE 16, a driver pulley 130 is rotatably mounted on the support member 115 adjacent the drum 117. A belt member 131 surrounds the pulley 130 and drum 117 as best seen in FIGURE 14. It will be understood that the power source 12 drives the pulley 130 and, through the belt 131, the drum 117.

Referring now to FIGURES 8, 14 and 17, I illustrate means for producing rotation of the vehicle of my invention about its vertical axis. For convenience, the lift or motion-producing assemblies positioned on opposite sides of the operator's station 15 may be designated by the numeral 10a. One such assembly is illustrated particularly in FIGURES 14 and 17. Secured to the upper end of the control stick 63, as best seen in FIGURE 8, is a crossarm member 150. The member 150 has its ends extending in opposite directions from the stick 63 normally laterally of the arms 3a which support the assemblies 10a. Control cables or members 151 extend from the opposite ends of the arm 150 outwardly along and paralleling the arm 3a which support the assembly 10a. It will be observed that a pair of cables 151 extend outwardly to the left and are secured at their outer ends to a second crossarm 152 shown best, for example, in FIGURE 14. It will be realized that a similar pair of cables 151 extends outwardly to a similar crossarm associated with the opposite assembly 10a.

The crossarm 152 is secured to the lower, downwardly extending portion 155 of an eccentric shaft member 156 which is in turn supported in a cylindrical vertical housing 157 extending through the outer end of the support arm 3a and through the support member 115. The shaft 156 has a lower elongated portion 156a which extends through the arm 3a and upwardly into the member 115. An upper eccentric portion 156b is positioned within the plane of the upper plate 115a of the member 115, and may, for example, be positioned within a circular bracket 115b and held therein by an annular flexible member 115c which may, for example, have the properties of rubber. Similarly, a bracket 115d secured to a lower plate member 115e of the member 115 may surround the shaft housing 157 and may retain a similar flexible annulus 115f in contact with the cylindrical surface of the housing 157. Since the entire rotor assembly and motor are mounted on the members 115 and 115a, which constitute the support therefor, tilting action of the plates will tilt the motor and rotor. The blades and rotor, motor and various controls are mounted on the plates or members 115 and the plates or members 115 are supported on the sleeve or housing 157 through the rubbers 115c and 115f. When the eccentric 156b is rotated, the upper portion of the assembly, including the upper plate 115a, will be displaced circumferentially, while the lower portion will not since the eccentric is only effected at the top or against the upper plate or member 115a in FIGURE 17. It should be borne in mind that substantially the entire support for the rotor assembly and power unit and the members 115 and 115a, for example in FIGURE 17, is on the shaft housing 157. This housing 157 is secured in the outer end of the boom or arm 3a in FIGURE 17. Rotation of the eccentric will, therefore, tilt the entire assembly, causing the rotor axis to be displaced to a predetermined dihedral angle.

As shown in FIGURES 1 and 3, a pair of guy wires or tension members are designated by the numeral 160. Each of the members 160 extends from a point 27, at which the struts 25, 26 are joined to one of the two radially rearwardly extending arms 19, upwardly to a point 28 at which the adjacent strut 25 is attached to the arm 3 above the other rearwardly extending arm 19. Thus the members 160 cross at a point substantially intermediate their ends and together lie in the plane of the two struts 25 positioned to the rear of the central axis and the operator's seat 15 of the hull 1. Each of the members 160 incorporates an adjustment element, such as the turnbuckle 161, to permit variance of the tension thereof. Compensation for any rotational torque effect which may be produced by the assemblies 10 is accomplished through a twisting of the body 1 produced by the members 160.

The upper horizontally disposed frame, designated 16 in FIGURE 2, is disposed generally in a plane parallel to the lower horizontally disposed frame 17. The upper and lower frames are interconnected by the various struts or arms 25 and 26. The connections are such that the upper frame may be skewed or rotated slightly relative to the lower frame and vice versa. Thus, in FIGURE 1, if the one cable 160 is taken in and the other payed out, the upper and lower frames 16 and 17 will be twisted slightly in one direction. If the other cable 160 is shortened and the first lengthened, the frames will be twisted or rotated slightly, relative to each other, in the other direction. The amount of adjustment or actual physical movement is small.

The importance of this is that if the axes of all of the rotors were disposed exactly vertically, the entire assembly would have a cumulative unbalanced torque since all of the rotors turn in the same direction. But the tension members or guy wires 160 are adjusted so that the axes of all of the rotors are tilted slightly against the direction of rotation to offset or counter-balance the cumulative torque.

Whereas I have described and claimed a practical and operative device, nevertheless, many changes may be made in the size, shape, number and disposition of parts without departing from the spirit of my invention. I therefore wish my description and drawings to be taken as in a broad sense illustrative or diagrammatic, rather than as limiting me to my precise showing.

It should be recognized, for example, that the number of rotors shown is illustrative and that use of a larger number is within the scope of my invention and may, in some instances, be desirable. As the number of rotors increase, a point will be reached where it is only necessary to control the pitch of the rotors in groups, rather than individually, thus giving increased rotor multiplication without increasing rotor control complications at the same rate.

The use and operation of my invention are as follows:

I provide a flying machine of maximum reliability and efficiency at a minimum cost. Each of the lift or motion-producing assemblies 10 is an independent unit, composed of an individual rotor assembly, having its own power source which is in turn supplied with the necessary fuel from a separate fuel tank. Thus, upon failure, for any reason, of any one of the lift-producing assemblies or any portion or element in one of the lift-producing assemblies, such failure will have no effect on those remaining and the vehicle may be safely operated to a safe landing. In such event, for balance, the operator need simply reduce the thrust of the lift assembly opposite the defective one and, if necessary, may shut the opposed assembly down completely. If desired, the thrust produced by the remaining lift assemblies may then be increased to compensate for the amount of thrust lost by the failed and intentionally shut-down assemblies. Prior to readjusting the lift of the remaining rotors, the ship will merely moderately increase its rate of descent and will thereby increase the lift of the remaining rotors automatically.

The operator seated in the seat 15 has just two control members to be operated. After each of the power plants 12 has been started, the direction control stick 63 is maintained in the neutral position and the operator merely raises upwardly the control arm 24. By so doing, the brackets 92 are moved downwardly and thereby serve to exert a pull on each of the pitch control cables 78 and also on each of the throttle or carburetor control cables 76. Thus is simultaneously produced an increase in thrust of all six lift producing assemblies. It will be observed that both the pitch and the power are changed simultaneously. Connecting throttle and pitch controls to produce simultaneous action provides a simplified control and a self-governing engine speed. When the power source 12, for example, comprises a two-cycle engine, it can be shown that such an engine has speed-torque curves which may be plotted at various throttle settings. Similarly, the speed-torque curves of a typical rotor may be plotted for various blade pitches. Since lift is closely proportional to torque at any particular blade setting, increased torque means increased lift and vice versa.

Thus upward motion of the control arm 24 by increasing the thrust of all six lift-producing assemblies, results in vertical ascent of the vehicle.

When the operator desires to move through the air in a forward direction, it is necessary only that the stick 63 be moved directly forward. In so doing, the operator causes the control cables 78 and throttle cables 76 of the two rear lift assemblies 10 to be pulled and thus to produce increased lift on these two rear assemblies. At the same time, the lift of opposite lift assemblies is decreased. This action causes a corresponding forward tilting of the vehicle about its lateral axis and of the overall line of thrust produced by the lift assemblies thereof and the vehicle will fly forward. Similarly, the operator produces rotation about the longitudinal axis by a sideward motion of the control arm 63 thus producing, by means of the appropriate cables 76 and 78, an increase of lift or thrust produced by those assemblies 10 on the outside of the turn about the longitudinal axis.

When the operator desires to turn the vehicle about its central vertical axis either left or right, it is necessary only that the operator rotate the stick 63 in the desired direction. Rotation of the stick 63, by turning the crossarm 150 fixed thereon, and by means of the control cable 151 produced a rotation of the crossarm 152, and thus of the eccentric shaft 156, effective to rotate the eccentric 156a. Rotation of the eccentric 156b causes a tilting of the support 115, the flexible annuli 115c and 115f being compressed accordingly, effective to permit such tilting about the fixed sleeve 157. Thus, the line of reaction or thrust of the right hand assembly 10a may be tilted forward when a turn to the left is desired, for example.

Multi-propeller helicopters have been known in which a plurality of propellers have been driven by a single power source and directional or azimuthal control has been attempted by collectively increasing the pitch of propellers turning in a clockwise direction and decreasing the pitch of propellers turning in a counterclockwise direction, the propellers being rotatable about converging axes. I have found such control to be inadequate, however, and consider reliance upon the single power source unwise and the complicated mechanism necessary to achieve said control to be below acceptable safety criteria.

It will be observed that the rotors disclosed herein are arranged symmetrically about the vertical axis of the vehicle 1 in pairs of diametrically opposed individual rotors. It will be understood that various arrangements or grouping of my thrust-producing units may be employed in accomplishing the improved operational results set forth herein.

The axis of the rotors herein may lie in planes bearing the same relationship to a vertical plane through the vehicle and may be out of parallel with each other only enough to counteract the cumulative torque effect of all rotors turning in the same direction. When a turn about the vertical axis of the vehicle is desired the axis of the appropriate assembly 10a is tilted to accomplish the same. The arrangement of the rotors coupled with the particular control system disclosed herein permit the lift force to work against the cable controls to produce an increase in thrust on the part of one rotor and a corresponding simultaneous decrease on the part of the opposed rotor automatically. The effect of updraft on one rotor is automatically compensated for, through the cables 78, 76 which cause a compensating effect upon the diametrically opposed rotor. Thus I provide an automatic stability. Since the control of the pitch of the rotor blades 11a and the power produced by the power plant 12 are controlled together, it will be seen that my control system is greatly simplified. For interchangeability and greater simplicity, I provide lifting assemblies which all turn in the same direction. A fixed compensation for any overall torque effect on my vehicle is adjustably provided by the tension members 161.

While I have described movement of the stick 63 and its effect on the cables 78, 76 to create rotation of my vehicle about its lateral, longitudinal and vertical axes, it will be realized that the stick 63 is universally supported and that movement of the stick in any direction provides motion of the vehicle in that direction. For example, movement of the stick 63 directly to the left produces an increase in thrust on the right side of the vehicle and a corresponding decrease on the left, a tilting to the left of the vehicle and a resulting flight or movement of the vehicle sideward through the air. Similarly, movement of the stick, for example, in the direction of 45 degrees to the right of directly forward causes the vehicle to fly in an oblique forward direction.

The normal range of lift of each thrust assembly may be set at a minimum, for example 10 pounds, which is less than the maximum thrust of which the assembly is capable. Thus, upon failure of any one assembly, movement of control stick 63 away from the failed assembly, which is the normal reflex action of the operator, immediately reduces the oppositely disposed assembly to the established minimum lift providing an automatic compensation or correction for the loss of lift and an automatic equalizing action with respect to lift forces acting at points about the center of gravity of the vehicle.

Figure 18:
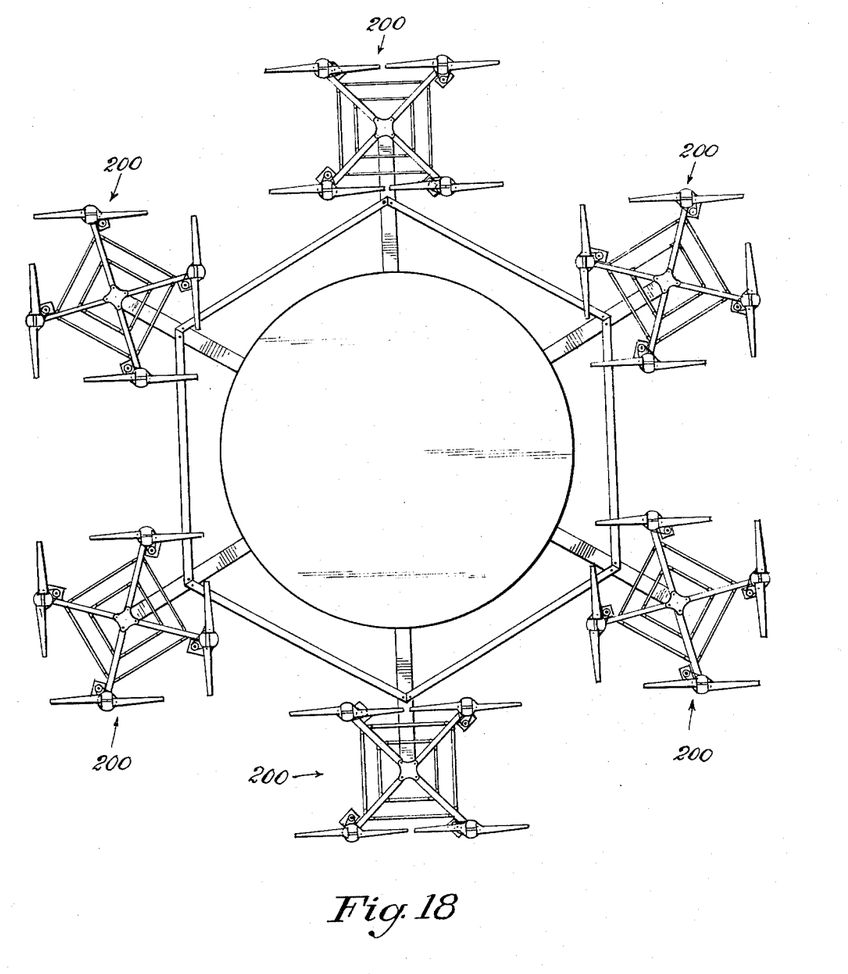
FIGURE 18 is a top plan view, on a reduced scale, of a variant form of my invention.

With respect to the variant form illustrated in FIGURE 18, I provide a plurality of groups of thrust assemblies disposed about the center of gravity or vertical axis of my air vehicle. Each group 200 may be composed of two or more rotors, depending upon the size of the vehicle and total weight to lifted. Of course the rotor groups may be controlled in a manner similar to that described above, the advantages of independent rotor and power plant units being retained within each group and these advantages as well as those respecting vehicle operation and control being retained within the entire construction.

I claim:

1. In a flight vehicle, a vehicle body, a plurality of thrust-producing assemblies mounted upon and disposed about the vertical axis of said body, each said assembly including a rotor, a power source and a driving connection between said power source and said rotor, means for control of the pitch and power for each rotor through a predetermined range, said assemblies being mounted in pairs, the members of each pair being positioned on opposite sides of said axis, the range of said pitch and power variance being sufficient to permit reduction of the pitch and power produced by one of said assemblies, in response to loss of pitch and power produced by the opposite assembly, to a point effective to maintain balance of the vehicle without substantial shifting of the center of gravity of said vehicle.

2. In an air transportation vehicle, a vehicle frame with a generally upright axis, a plurality of pairs of thrust creating assemblies diametrically disposed about the axis of the frame, each assembly including a rotor, a power source and a driving connection therebetween, said assemblies being productive of equal generally upward thrust at diametrically opposed points about the frame axis, control means on the frame for individually and collectively controlling the pitch and power produced by the assemblies, said control means including a control member normally manually movable away from an assembly to increase the pitch and power produced thereby and to simultaneously decrease the pitch and power produced by the opposite assembly.

3. A flight transportation vehicle, comprising a vehicle frame having a generally upright central axis, a plurality of independent thrust producing assemblies mounted on the frame and disposed about the central axis thereof in generally radially opposed pairs, each assembly including a rotor, a power source and a driving connection therebetween, control means operable to reduce the pitch and power produced by any of the assemblies upon a reduction in pitch and power produced by an oppositely disposed assembly, said assemblies being of a number sufficient to maintain flight in the presence of the reduction of the thrust of the oppositely disposed assemblies.

4. In an air transportation vehicle comprising a vehicle body with a generally upright axis, a plurality of thrust creating assemblies mounted on said body in diametrically opposed pairs disposed about the body axis, each of said assemblies including a rotor and a power plant in driving connection therewith, control means for said assemblies including simultaneously operable control elements connected to the power control of the power plant and to the pitch control of the rotor of each assembly whereby the power supplied by the power plant and the pitch of the rotor may be controlled together, the control elements of each assembly being connected to and operable in response to movement of a control arm mounted on the vehicle body whereby an increase in the power and pitch of one assembly in any pair simultaneously decreases the power and pitch of the opposed assembly.

5. In an air transportation vehicle of the type described, a vehicle body having a generally upright axis, said body including a plurality of interconnected, hollow tubular structural members defining upper and lower generally horizontally disposed frame elements interconnected at least in part by generally upright strut members, said tubular members being generally radially arranged in said upper and lower frame elements, at least some of the strut members having seal elements spaced therewithin to define fuel containers, at least some of the tubular structural members in the upper frame element having an exhaust inlet and an exhaust outlet, said exhaust outlets being generally adjacent the center of the vehicle body, a plurality of thrust creating rotor assemblies mounted in diametrically opposed pairs disposed about the axis of said body, said assemblies including rotors mounted for rotation about axes generally paralleling the upright axis of the body, and control means whereby the assemblies in at least one of said pairs are simultaneously circumferentially tiltable on said body.

6. The structure of claim 5 further characterized in that the strut members which function as fuel containers are inclined upwardly and outwardly between the frame elements and connect to the upper section generally adjacent the rotor assemblies.

References Cited in the file of this patent

UNITED STATES PATENTS

| | | |
|---|---|---|
| 668,073 | Worth | Feb. 12, 1901 |
| 1,540,706 | Oehmichen | June 2, 1925 |
| 1,749,471 | De Bothezat | Mar. 4, 1930 |
| 1,919,089 | Breguet et al. | July 18, 1933 |
| 1,922,371 | Jones | Aug. 15, 1933 |
| 2,116,055 | Weichwald | May 3, 1938 |
| 2,664,958 | Dancik | Jan. 5, 1954 |
| 2,686,019 | Shapiro et al. | Aug. 10, 1954 |
| 2,712,855 | Lightbourn | July 12, 1955 |

FOREIGN PATENTS

| | | |
|---|---|---|
| 730,965 | France | Aug. 26, 1932 |
| 809,963 | France | Mar 12, 1937 |